Patented Nov. 28, 1950

2,532,206

UNITED STATES PATENT OFFICE 2,532,206

OINTMENT BASE OF GLYCERINE WITH PHOSPHATIDE AND PETROLATUM

Abraham Taub and Morris Mattikow, New York, N. Y., assignors to Vodol Company, Chicago, Ill., a corporation of Illinois No Drawing. Application July 1, 1946, Serial No. 680,844

2 Claims. (Cl. 167—63)

This invention relates to an ointment base and method and more particularly to an ointment base of semi-solid consistency and method of making in which a relatively large amount of liquid hygroscopic material is incorporated into a semi-solid oleoginous material while retaining the resulting composition in a semi-solid or plastic condition suitable for application to the skin and other body tissues.

In accordance with the present invention, a major amount of a liquid hygroscopic material, for example, glycerine, can be incorporated into an oleaginous material such as petrolatum while still retaining the resulting material in a semisolid condition similar to that of petrolatum. The resulting ointment base material is readily dispersible in water in contrast to the petrolatum or other oleaginous material which is, in general, relatively resistant to dispersion in water. Thus, any medicaments contained in the ointment base material are readily liberated by contact with an aqueous medium.

The preferred materials for forming the ointment base of the present invention are glycerine, petrolatum and oil-free corn oil phosphatides and the specific disclosure of the present application will be directed principally to compositions containing such material. Glycerine is an accepted substance for application to body tissues and finds extensive use in the pharmaceutical and medical fields. It is a recognized ingredient in cosmetics where its properties as a solvent, emollient, lubricant and penetrant are valued. Furthermore, glycerine is known to hasten healing. Its liquid state, however, limits its employment in many cases. It is not possible to thicken glycerine with commonly known thickening agents such as gelatin, natural and synthetic gums, or pectin. Also wax cannot be employed as glycerine is not miscible with waxes. By employing a small amount of phosphatides with petrolatum, however, a large amount of glycerine can be incorporated into the petrolatum to produce a semi-solid material consisting predominantly of glycerine. When incorporated into petrolatum, the hygroscopic nature of the glycerine is very much reduced. This is a definite advantage as liquid glycerine, in some cases, tends to excessively extract moisture from body tissues.

The resulting ointment base is extremely bland and helps in the healing of open wounds or other open lesions, particularly if the ointment base contains a suitable medicament. The ointment base containing glycerine may be prepared in substantially anhydrous form or may contain a small amount of water. In any case, it is easily dispersible in water and compatible with most medicaments which are desirably employed in ointments.

It is therefore an object of the present invention to provide an improved ointment base material having the consistency of a salve but which contains a major proportion of a liquid material.

Another object of the invention is to provide an ointment base material containing a major proportion of glycerine but which has a semi-solid consistency suitable for application as a salve or ointment.

Another object of the invention is to provide an improved ointment base containing petrolatum and a major proportion of a hygroscopic liquid material which is compatible with a large number of medicaments and which is readily dispersible in water.

A further object of the invention is to provide a method of incorporating a relatively large amount of a hygroscopic liquid material into petrolatum to form a semi-solid material having the consistency of a salve or ointment.

Other objects and advantages of the invention will appear in the following description of preferred embodiments of the invention.

The preferred composition in accordance with the present invention contains a minor proportion of petrolatum, a major proportion of glycerine and a small amount of an oil-soluble phosphatide, as a dispersing agent. The resulting composition is in the form of a gel in which the liquid material is dispersed in the petrolatum although no ingredients commonly recognized as gelling agents are employed. In preparing the composition of the present invention, the petrolatum is heated to approximately 90° C., i. e., to slightly above the melting point of the petrolatum. Higher temperatures may, however, be employed up to approximately 140° C., although the temperature is preferably maintained below 120° C. in order to prevent thermal degradation of the phospholipid dispersing agent. A small amount of the dispersing agent is dissolved in the heated petrolatum by adding the agent to the heated petrolatum and stirring. The resulting mixture is then cooled to 20 to 25° C., i. e., until it is of semi-solid consistency, and the glycerine thereafter added in small quantities and thoroughly worked into the cooled material. It is found that glycerine in as much as seven times the amount of petrolatum may thus be incorporated into the petrolatum to form a semi-solid material suitable for ointment bases.

As a specific example of preparing an ointment base in accordance with the present invention, nine parts by weight of petrolatum were heated to 90° C. on a steam bath and one part of oil-free corn oil phosphatides added thereto with constant stirring. When the phosphatides were completely dissolved or dispersed in the petrolatum, the resulting mixture was cooled to room temperature. Glycerine was then added in small amounts to the petrolatum-phosphatide mixture with constant stirring to individually work in each amount of glycerine until 40 parts thereof were incorporated. A semi-solid material was formed in which the glycerine was dispersed in the petrolatum. This material is a smooth homogeneous ointment which is extremely stable at room temperatures or higher, for example, up to 50° C. for prolonged periods. Substances which require the absence of water for stability, for example, urea peroxide, may be dissolved in anhydrous glycerine prior to being incorporated into the petrolatum-phosphatide mixture. A small amount of water may, however, be present when medicaments which are stable in the presence of water are employed.

The phospholipid preferably employed as a dispersing agent consists of phosphatides recovered from corn oil as such phosphatides are light in color and extremely stable. When recovered from corn oil, the phosphatides ordinarily contain approximately 35% corn oil and this oil is preferably removed from the phosphatides by any suitable or known solvent, for example, acetone in which the phosphatides are insoluble can be employed to remove the corn oil from the phosphatides. Other phosphatides can, however, be employed, for example, soya bean or cottonseed oil phosphatides as well as synthetic phosphatides and compounds or derivatives of phosphatides. The preferred amount of phosphatides on the basis of the petrolatum is approximately 10% by weight. The ratio of phosphatides to petrolatum may, however, be varied through a considerable range, for example, from 1 to 20% of the weight of the petrolatum or other oleaginous material. The amount of glycerine employed may also vary through a considerable range. For example, the amount of glycerine can range from approximately 10 to 70 parts by weight when 10 parts of the phosphatide-petrolatum mixture are employed. Upon a percentage basis by weight, this is 50 to 87.5% glycerine and 50 to 12.5% phosphatide-petrolatum mixture. Thus, the glycerine may constitute the major portion of the material and in the preferred compositions will usually range between approximately 70 and 85% of the base.

Similar types of compositions may be produced with other liquid hygroscopic materials. For example, most polyhydroxy compounds having a molecular weight at least as great as glycerine including solids in aqueous solution. Thus, concentrated aqueous solutions of most sugars can be incorporated into petrolatum-phosphatide admixtures in relatively large amounts to form a gel structure. Thus, commercial corn or glucose syrup which may be a water solution containing 70 to 75% glucose may be substituted in whole or part for the glycerine in amounts ranging from approximately 10 to 40% of the syrup to 10 parts of the petrolatum-phosphatide mixture. Similarly, a 70% sorbitol aqueous solution may be incorporated into the petrolatum-phosphatide mixture in amounts ranging from approximately 10 to 30 parts when 10 parts of the phosphatide-petrolatum mixture are employed Also glycerol borate or liquid polyethylene glycols starting with nonaethylene glycol can be substituted in whole or in part for glycerine.

Since the sugars referred to are solids when in water-free form, the water is necessary to produce the liquid hygroscopic material. In the case of glycerine or liquid polyethylene glycols, however, the ointment base may be substantially anhydrous although it may usually contain water up to approximately 10% based on the weight of the hygroscopic material. The sugar solutions result in non-sticky semi-solid materials capable of being used as ointment bases for many purposes but the compositions containing glycerine are, in general, more suitable, one reason being that they can be prepared in either anhydrous form or containing substantial amounts of water. Thus, medicaments which are not compatible with water can be employed in water-free forms of the ointment base or medicaments which are readily soluble in water can be employed in those containing water.

Although petrolatum is the preferred semi-solid material into which the liquid hygroscopic materials are incorporated, other semi-solid oleaginous materials may be substituted therefor in whole or in part. Thus, it is possible to employ such materials as lanolin or fatty glycerides or fatty acids which are semi-solids at room temperatures. In any case the ointment bases of the present invention are very stable and are not as hygroscopic as the hygroscopic materials employed therein. They do not draw water from the skin and are not irritating thereto. They are very bland and assist in healing wounds leaving a soft scab and are particularly adaptable for use on burns. They have considerable miscibility with aqueous fluids such as serum from wounds and readily liberate medicaments incorporated therein.

While we have disclosed the preferred embodiments of our invention, it is understood that the details thereof may be varied within the scope of the following claims.

We claim:

1. As an ointment base, a semi-solid mixture containing between approximately 50% to 87.5% by weight glycerine, and between approximately 50% to 12.5% of a phosphatide and petrolatum mixture in which said phosphatides are between approximately 1% to 20% of the petrolatum.

2. The ointment base as defined in claim 1 in which water in an amount up to approximately 10% of the glycerine is also present.

ABRAHAM TAUB.
MORRIS MATTIKOW.

(References on following page)

REFERENCES CITED

The following references are of record in the file of this patent:

UNITED STATES PATENTS

| Number | Name | Date |
|---|---|---|
| 2,164,717 | Kritchevsky | July 4, 1939 |
| 2,271,410 | Thurman | Jan. 27, 1942 |

FOREIGN PATENTS

| Number | Country | Date |
|---|---|---|
| 172,579 | Germany | June 21, 1906 |
| 201,626 | Switzerland | Mar. 1, 1939 |
| 566,175 | Germany | Dec. 12, 1932 |
| 635,469 | Germany | Mar. 9, 1934 |

OTHER REFERENCES

Druggists' Digest, J. A. P. A. Prac. Pharmacy Ed., October 1944.

J. A. P. A. Abstracts Section, volume 11, No. 9, September 1936, pp. 390, 391.

Bennett: Cosmetic Formulary Chemical Publishing Co., pages 31, 35, 40 and 41 (1937).

Powers: Bulletin of National Formulary Committee, volume X, No. 8–9. August, September, 1942. Page 188.

Meleny: Bi-Monthly Progress Report No. 8, Oct. 1, 1944, Unclassified Report to Committee on Medical Research of the Office of Scientific Research and Development Contract OEMemr–334, 2 pages.

Journal of the American Pharmac. Assoc. Practical Pharmacy Edition, December, 1941, page 471.